United States Patent [19]

Azuchi

[11] 4,389,696
[45] Jun. 21, 1983

[54] TRIMMER CAPACITOR

[75] Inventor: Yukihiro Azuchi, Sabae, Japan

[73] Assignee: Murata Manufacturing Co., Ltd., Japan

[21] Appl. No.: 186,257

[22] Filed: Sep. 11, 1980

[30] Foreign Application Priority Data

Sep. 17, 1979 [JP] Japan .............. 54-128899[U]

[51] Int. Cl.³ ............................... H01G 5/06
[52] U.S. Cl. ............................... 361/293
[58] Field of Search .......................... 361/293

[56] References Cited

U.S. PATENT DOCUMENTS

| | | | |
|---|---|---|---|
| 2,475,144 | 7/1949 | Kodama | 361/293 |
| 3,588,642 | 6/1971 | Fabricius | 361/293 |
| 4,095,263 | 6/1978 | Johanson | 361/293 X |
| 4,101,951 | 7/1978 | Kuze | 361/293 |
| 4,283,751 | 8/1981 | Tatsumi | 361/293 |
| 4,292,660 | 9/1981 | Tatsumi | 361/293 |

Primary Examiner—Elliot A. Goldberg
Attorney, Agent, or Firm—Ostrolenk, Faber, Gerb & Soffen

[57] ABSTRACT

A trimmer capacitor is encased in an insulating case. The insulating case holds a stator terminal embedded therein. A dielectric stator is fixedly received in the insulating case and is provided with a stator electrode. The stator electrode is electrically connected to the stator terminal by contact with the exposed portion of the stator terminal within the insulating case. A metal rotor having a rotor electrode is placed on the dielectric stator. A projecting step is formed on the upper surface of the metal rotor. The projecting step is received in a throughgoing hole formed in one end of the rotor terminal and in this state the metal rotor is rotatably supported with respect to the rotor terminal. The throughgoing hole is located in the center of a dish-shaped spring portion. One end of the rotor terminal, including the dish-shaped spring portion, is locked by the upper edge of the insulating case, whereby a suitable amount of torque is attained by the springiness thereof with respect to the rotation of the metal rotor.

12 Claims, 22 Drawing Figures

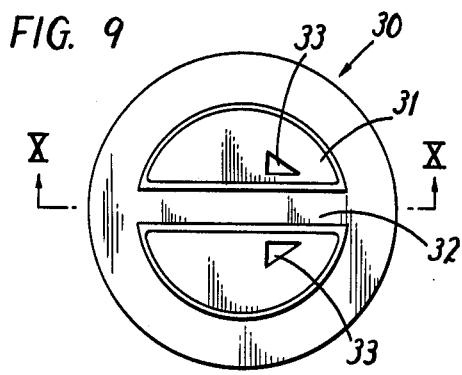
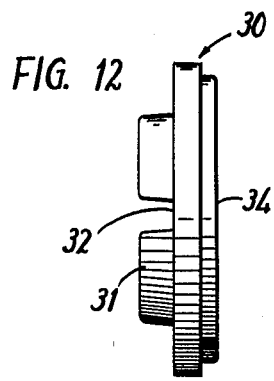
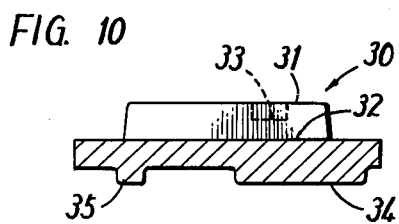
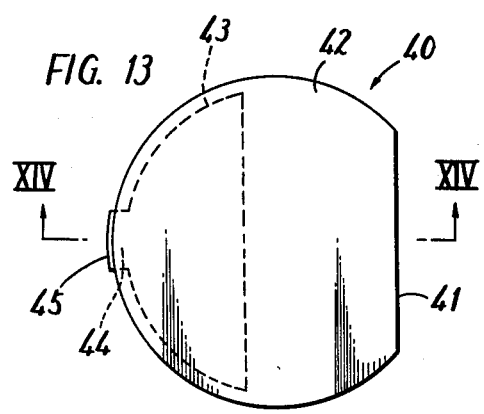
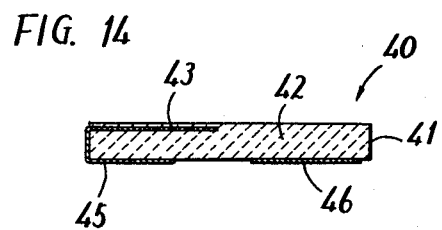
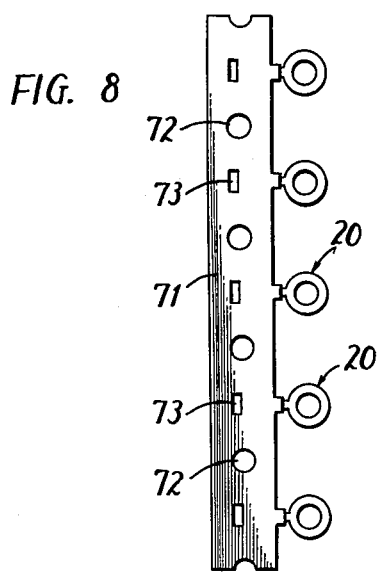
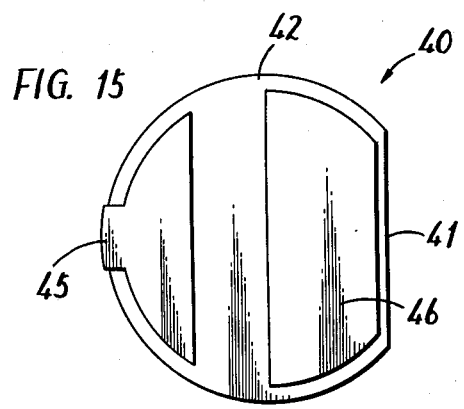

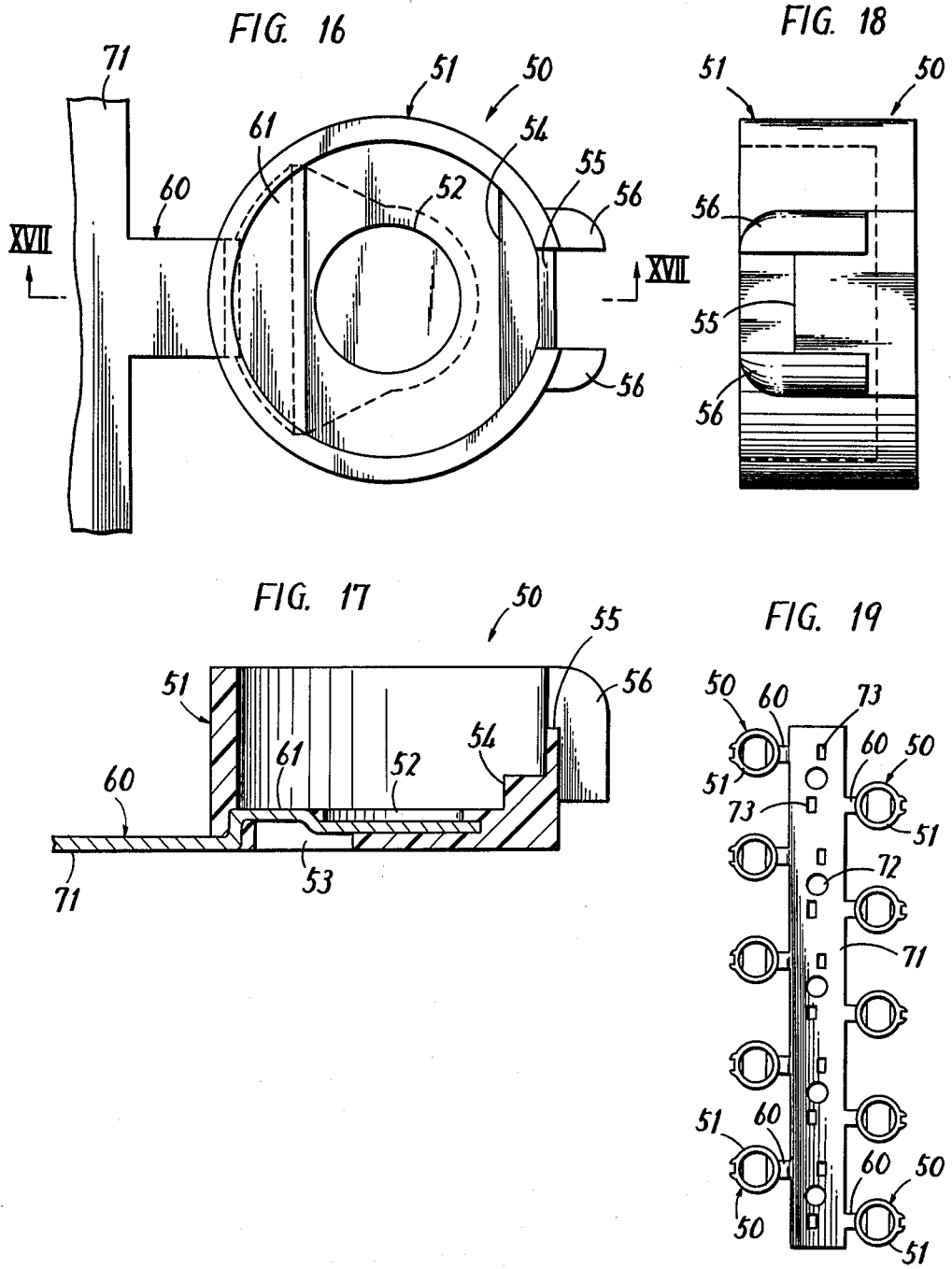

TRIMMER CAPACITOR

BACKGROUND OF THE INVENTION

1. Field of the Invention

The present invention relates to a trimmer capacitor and more particularly to a trimmer capacitor received in an insulating case and having no rotative shaft.

2. Description of the Prior Art

FIG. 1 is a sectional view showing an example of a conventional trimmer capacitor. The trimmer capacitor shown therein includes a stator 110 as a fixed part and a rotor 120 as a movable part. The stator 110, which is made of insulating material, such as resin, is provided on the upper surface thereof with a stator electrode 111 of, e.g., a sectorial pattern, and a stator terminal 112 is provided which extends from the stator electrode. The stator electrode 111 and stator terminal 112 are made of an electrically conductive unitary member. The rotor 120 includes a dielectric 122 which is made of, e.g., a ceramic material, and an inner electrode 121 of, e.g., a sectorial pattern embedded therein. Preferably, in order to prevent warp incidental to the firing of the dielectric 122 made of ceramic material, an idle electrode 123 may be formed in a portion where the inner electrode 121 is not formed. The stator 110 and rotor 120 are formed with central holes 113 and 124, respectively. Inserted in the central holes 113 and 124 is the stem portion of a central shaft 130 made of an electrically conductive material. The inner peripheral surface of the central hole 124 of the rotor 120 is formed with a metallized portion 142 made of silver or the like which is in electrically conductive contact with the inner peripheral edge of the inner electrode 121, and solder 143 is applied to a space defined between the metallized portion 142 and the stem portion 133, thus fixing the rotor 120 to the central shaft 130 and establishing the electrically conductive relation between the inner electrode 121 and the central shaft 130. The upper surface of the head 131 of the central shaft 130 is formed with an adjusting groove 132 for receiving the tip of a screwdriver (not shown) for adjustment of the capacitance of the capacitor. The end of the stem portion 133 of the central shaft 130 is crimped as at 134 after having fitted thereon a spring member 141 terminating at one end thereof in a rotor terminal 140. The spring member 141 functions to urge the rotor 120 against the stator 110 under suitable pressure and to produce torque.

In this trimmer capacitor, the stator electrode 111 is led out by the stator terminal 112, while the inner electrode 121 is led out by the rotor terminal 140 through the metallized portion 142, solder 143 and central shaft 130. A capacitance is formed between the stator electrode 111 and the inner electrode 121 and this capacitance is variable by the rotation of the central shaft 130, i.e., the rotation of the rotor 120.

The conventional trimmer capacitor as described above has the following disadvantages. First, since the crimping operation on the crimped portion 134 of the central shaft 130 requires strong force, the dielectric 122 of the rotor 120 often cracks. Further, the provision of electric conduction and mechanical fixation between the central shaft 130 and the inner electrode 121 (precisely, the metallized portion 142) requires soldering as at 143, which operation is very troublesome. Further, since the stator 110 is produced by molding resin with the stator terminal 112, the strength of the stator terminal 112 is low. Further, external force on the stator terminal 112 sometimes slightly vibrates the stator electrode 111, tending to cause variation in capacitance. Finally, assembly of the parts is difficult.

SUMMARY OF THE INVENTION

According to the present invention, great reduction in thickness can be achieved as compared with the conventional trimmer capacitor.

In brief, the present invention comprises a trimmer capacitor of the so-called shaftless type wherein the central shaft of the conventional trimmer capacitor has been eliminated and the parts are encased in an insulating case. The insulating case holds a stator terminal embedded therein. A dielectric stator is fixedly received in the insulating case and is provided with a stator electrode. The stator electrode is electrically connected to the stator terminal through a conduction path including an electric connection provided by contact with the exposed portion of the stator terminal within the insulating case. A metal rotor having a rotor electrode is placed on the dielectric stator and is formed on the upper surface thereof with a projecting step. The projecting step is received in a throughgoing hole formed in one end of the rotor terminal and in this state the metal rotor is rotatably supported. The said throughgoing hole is located in the center of a dish-shaped spring portion at one end of the rotor terminal, which is locked by the upper edge of the insulating case, the springiness providing a suitable amount of torque. The other end of the rotor terminal is led out of the insulating case.

In a preferred embodiment of the present invention, an idle electrode is formed on the surface where the rotor electrode of the metal rotor is formed. The idle electrode is formed as a step having the same height as that of the rotor electrode formed as a step protruding from the metal rotor. As a result, stability of the metal rotor on the dielectric stator is ensured. The dish-shaped spring portion of the rotor terminal disposed on the metal rotor is adapted such that the idle electrode is disposed on the surface at the position directly opposite to the position where the dish-shaped spring portion is in contact with the metal rotor. As a result, force is prevented from being undesirably applied to the metal rotor, whereby cracking of the metal rotor is prevented despite its relative thinness.

Accordingly, a principal object of the present invention is to provide a thin type trimmer capacitor.

Another object of the present invention is to provide a trimmer capacitor structured such that a rotatable member for adjustment of a capacitance is stably held.

A further object of the present invention is to provide a mechanical structure for desirably disposing various components constituting a trimmer capacitor without damaging such components.

Still a further object of the present invention is to provide a trimmer capacitor of a simple assembling process.

Still another object of the present invention is to provide a trimmer capacitor wherein a stabilized capacitance variation is attained through an adjusting operation and an adjusted capacitance is stably maintained.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a plan view of a material in an intermediate stage of a manufacturing process of the rotor terminal shown in FIG. 6;

FIG. 9 is a plan view of the metal rotor shown in FIG. 3;

FIG. 10 is a sectional view taken along the line X—X in FIG. 9;

FIG. 11 is a bottom view of the metal rotor shown in FIG. 9;

FIG. 12 is a view of the metal rotor shown in FIG. 9 as seen from the right-hand side of FIG. 9;

FIG. 13 is a plan view of the dielectric stator shown in FIG. 3;

FIG. 14 is a sectional view taken along the line XIV—XIV in FIG. 13;

FIG. 15 is a bottom view of the dielectric stator shown in FIG. 13;

FIG. 16 is a plan view of the insulating case assembly shown in FIG. 3;

FIG. 17 is a sectional view taken along the line XVII—XVII in FIG. 16;

FIG. 18 is a right side view of the insulating case assembly shown in FIG. 16 as seen from the righ-hand side of FIG. 16;

FIG. 19 is a plan view showing a material in an intermediate stage in a manufacturing process of the insulating case assembly shown in FIG. 16;

DETAILED DESCRIPTION OF THE PREFERRED EMBODIMENTS

Figure 1:
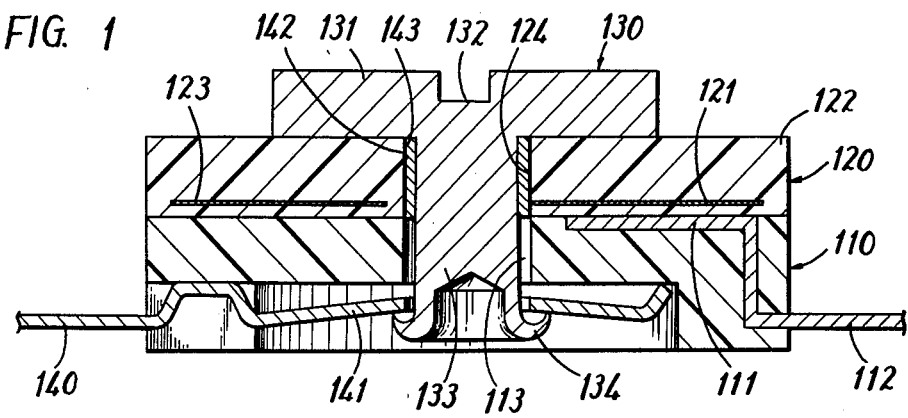
FIG. 1 is a sectional view showing one example of a conventional trimmer capacitor.
Figure 5:
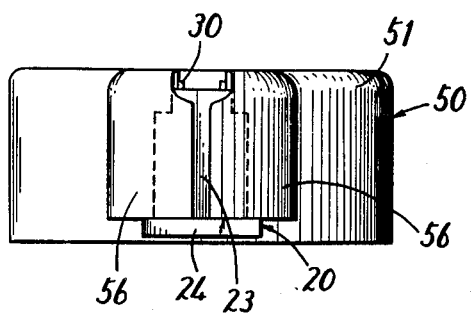
FIG. 5 is a view of the FIG. 2 trimmer capacitor as seen from the right in FIG. 2.
Figure 6:
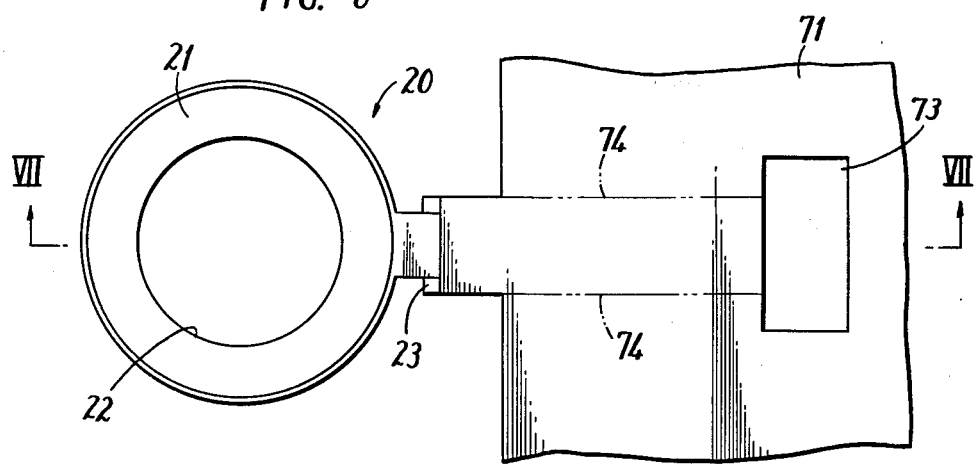
FIG. 6 is a plan view of the rotor terminal shown in FIG. 3.
Figure 2:
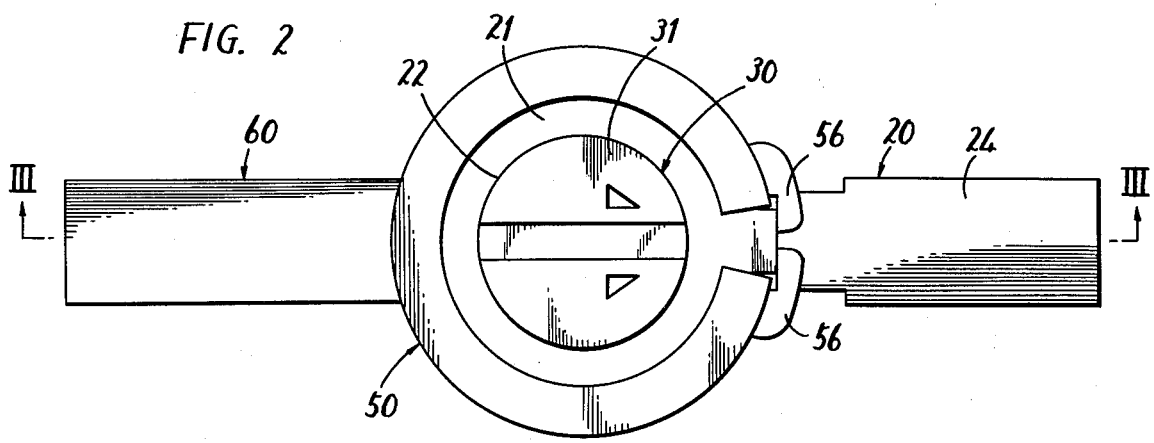
FIG. 2 is a plan view of one embodiment of the present invention.
Figure 3:
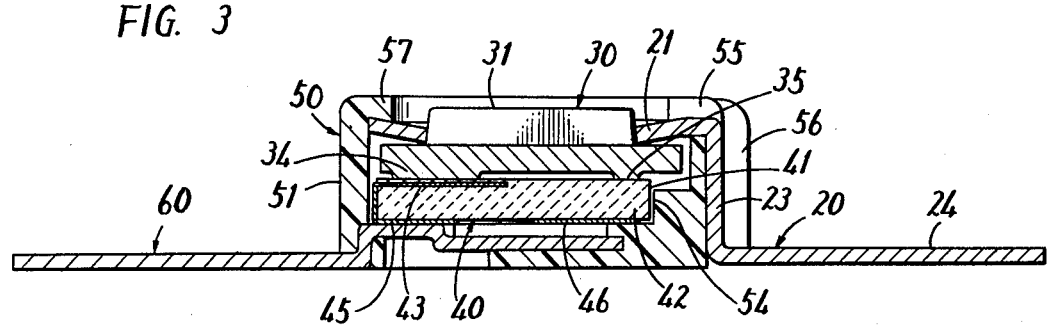
FIG. 3 is a sectional view taken along the line III—III in FIG. 2.
Figure 4:
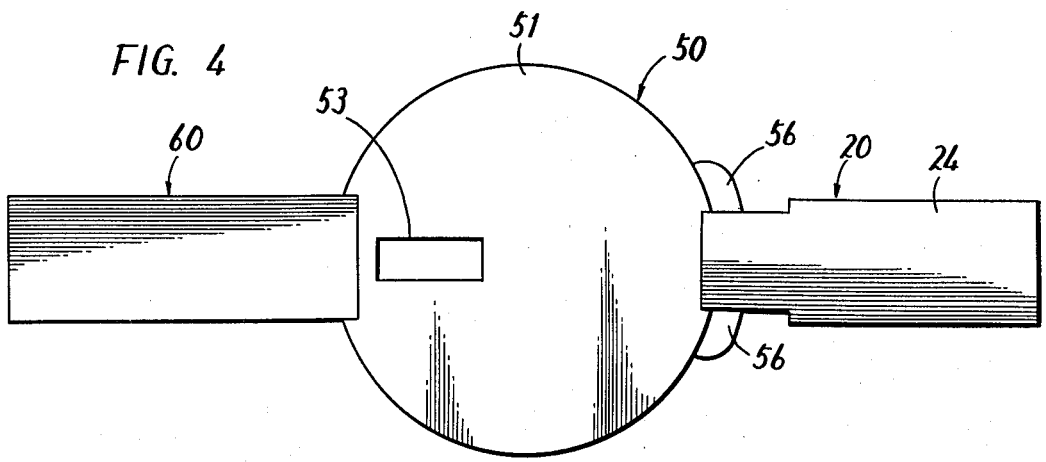
FIG. 4 is a bottom view of the FIG. 2 trimmer capacitor.

FIGS. 2 through 5 show an embodiment of the present invention. FIG. 2 is a plan view; FIG. 3 is a sectional view taken along the line III—III of FIG. 2; FIG. 4 is a bottom view; and FIG. 5 is a view from the right-hand side of FIG. 2. FIGS. 6 et seq. are views for explanation of the details of the parts.

The trimmer capacitor shown therein comprises four independent parts, namely, a rotor terminal 20, a metal rotor 30, a dielectric stator 40 and an insulating case assembly 50. The insulating case assembly 50 is, for example, insert-molded integrally with one end portion of a stator terminal 60. Reference will now be made in more detail to FIGS. 2 through 5 along with FIGS. 6 et seq.

Figure 7:
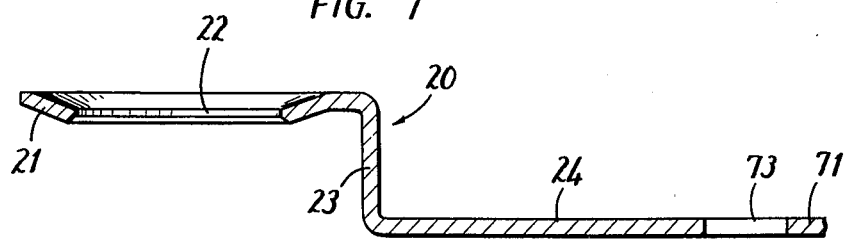
FIG. 7 is a sectional view taken along the line VII—VII in FIG. 6.

FIG. 6 is a plan view of the rotor terminal 20; FIG. 7 is a sectional view taken along the line VII—VII of FIG. 6; and FIG. 8 is a view showing rotor terminals 20 being produced. A plurality of rotor terminals 20 are produced out of a single sheet of, e.g., phosphor bronze. For this purpose, the plurality of rotor terminals 20 are prepared held on a ribbon 71 (FIG. 8). The ribbon 71 is formed with apertures 72 at predetermined intervals for positioning and feeding purposes and pins on a sheet metal processing machine or the like (not shown) are received in the apertures to position the ribbon at a predetermined position. Further, the ribbon is provided with rectangular holes 73 opposed to the rotor terminals 20. The individual rotor terminals 20 held on the ribbon 71 can be taken out simply by cutting along broken lines 74 (FIG. 6). In so doing, the connecting portions of the rotor terminals 20 with respect to the ribbon 71 are shortened and stabilized operation can be performed. Each of the rotor terminals 20 cut off from the ribbon 71 is provided at one end thereof with, e.g., a dish-shaped spring portion 21, which is centrally formed with, e.g., a circular throughgoing hole 22. The dish-shaped spring portion 21, which may be frustoconical, is formed with a terminal portion 24 through an upright portion 23 (FIG. 7).

FIGS. 9 through 12 show the metal rotor 30. FIG. 9 is a plan view; FIG. 10 is a sectional view taken along the line X—X of FIG. 9; FIG. 11 is a bottom view; and FIG. 12 is a view from the right-hand side of FIG. 9. The metal rotor 30 is made of metal (electrically conductive material), such as brass. It is formed on the upper surface thereof with a projecting step 31 which is, e.g., circular and which is formed with a diametrically extending adjusting groove 32. Triangular direction marks 33 are formed at the opposite sides of the adjusting groove 32. A sectorial or semicircular rotor electrode 34 projects from the lower surface of the metal rotor 30. The side opposite to the side where the rotor electrode 34 is present is formed with an idle electrode 35 having the same projecting height as the rotor electrode 34. The idle electrode 35 is so small as compared with the rotor electrode 34 that it does not substantially influence the capacitance. In addition, the metal rotor 30 shown in FIGS. 9 through 12 is to be taken as being in the course of manufacture. As can be seen in comparison with FIG. 3, the surfaces of the rotor electrode 34 and idle electrode 35 are polished until they are smooth. Accordingly, the rotor electrode 34 and idle electrode 35 shown in FIGS. 10 and 12 are projecting higher than that shown in FIG. 3.

FIGS. 13 through 15 show the dielectric stator 40. FIG. 13 is a plan view; FIG. 14 is a sectional view taken along the line XIV—XIV of FIG. 13; and FIG. 15 is a bottom view. The dielectric stator 40 is substantially circular and has a straight cut portion 41. The substantial portion of the dielectric stator 40 is made of a dielectric 42. The dielectric 42 is made, e.g., by laminating dielectric sheets and during the lamination process a stator electrode 43 is provided as an inner electrode. The stator electrode 43 is sectorial or semicircular. The stator electrode 43 is led out to the outer periphery of the dielectric 42 by a lead-out portion 44 and is electrically connected to a lead-out electrode 45 extending from the outer periphery of the dielectric 42 to the lower surface thereof. The lower surface of the dielectric 42 is formed with an idle electrode 46 on the side opposite to the side where said lead-out electrode 45 is present. The idle electrode 46 is electrically independent and does not constitute a means for forming capacitance.

FIGS. 16 through 19 are explanatory of the insulating case assembly 50. FIG. 16 is a plan view; FIG. 17 is a sectional view taken along the line XVII—XVII of FIG. 16; FIG. 18 is a view from the right-hand side of FIG. 16; and FIG. 19 is a view showing insulating case assemblies 50 being produced. The insulating case assembly 50 comprises an insulating case 51 made of, e.g., thermoplastic resin of insulating nature, such as thermoplastic resin of PBT, for example, and a stator terminal 60 which is insert-molded in the manner described above. The stator terminal 60 is made of electrically conductive material, such as phosphor bronze. As in the rotor terminals 20, a plurality of stator terminals 60 are prepared held on a ribbon 71 having apertures 72 for feeding and positioning purposes and rectangular holes 73. In this state, the molding of insulation cases 51 is performed. Recesses 52 and 53 in the insulation case 51 are produced as a result of the metallic mold directly contacting the stator terminal 60 for properly positioning the latter in the mold. The insulating case 51 has an opening in the upper end for receiving the various parts described above. The stator terminal 60 has an exposed portion 61 on the bottom of the insulating case 51. The exposed portion 61 is formed as a radially intermediate portion of one end portion of the stator terminal 60. A straight flat wall portion extends upwardly from the bottom of the insulating case 51. The lateral wall opposite to the side where the stator terminal 60 is led out is formed with a notch 55 and with a pair of clamp portions 56 spaced apart from each other a distance corresponding to the width of said notch 55 and extending outward therefrom. The insulating case assembly 50, like the rotor terminal 20, becomes an independent part when cut until a rectangular hole 73 in the ribbon 71 is reached.

Assembly of the trimmer capacitor shown herein will now be described. First, the insulating case assembly 50 is prepared, and the dielectric stator 40 is inserted into the insulation case 51. The dielectric stator 40 is positioned with its cut portion 41 adjacent and facing the flat wall portion 54 of the insulating case 51 so that its rotation within the insulating case 51 is inhibited. In this instance, the lead-out electrode 45 comes in contact with the exposed portion 61 of the stator terminal 60 to establish the electric connection. The idle electrode 46 eliminates the possibility of a difference in level produced by the lead-out electrode 45 extending along the lower surface of the dielectric stator 40, thereby eliminating in stability of the dielectric stator 40 within the insulating case 51. Subsequently, the metal rotor 30 is inserted. In this instance, the rotor electrode 34 is located over the stator electrode 43 with the thin film of the dielectric 42 intervening therebetween. The idle electrode 35 prevents the metal rotor 30 from being tilted owing to the difference in level due to the presence of the rotor electrode 34 and ensures stabilized rotation of the metal rotor 30. The rotor terminal 20 is then inserted. The positioning of the rotor terminal 20 is such that its throughgoing hole 22 receives the projecting step 31 on the metal rotor 30 and that the upright portion 23 extends from the notch 55 in the insulating case 51 along the outer surface of the insulating case 51. In this state, the dish-shaped spring portion 21 is fitted in the inner peripheral surface of the insulating case 51. Assembly of the parts has thus been completed.

As the final step, the step of retaining the parts in the insulating case 51 is then performed. In this step, the upper edge of the insulating case 51 is turned in while being heated to form a locking portion 57. The pair of clamp portions 56 are also turned in toward each other while being heated (FIG. 2), thereby clamping the upright portion 23 of the rotor terminal 20. The steps of heating and turning the upper edge of the insulating case 51 and heating and turning of the pair of the clamp portions 56 may be carried out simultaneously, as a single step. By doing so, the producing process becomes extremely efficient. In this state, since the outer periphery of the dish-shaped spring portion 21 is locked by the locking portion 57, the dish-shaped spring portion 21 acts to press the dielectric stator 40 and metal rotor 30 against the bottom of the insulation case 51. Therefore, the rotation of the metal rotor 30 is opposed by a torque due to the dish-shaped spring portion 21. Further, since the metal rotor 30 has its projecting step 31 received in the throughgoing hole 22 of the rotor terminal 20, the metal rotor 30 can be rotated in a stabilized manner in this received state. As better shown in FIGS. 2 and 3, the dish-shaped spring portion 21 of the rotor terminal 20 is in elastic contact with the upper surface of the metal rotor 30 along the periphery thereof. The idle electrode 35 is disposed on the lower surface of the metal rotor 30 at the position corresponding to the above described elastic contact position of the dish-shaped spring portion 21. Selection of this specific position prevents undesired forces causing distortion of the metal rotor 30 when the elastic force is applied from the dish-shaped spring portion 21 to the metal rotor 30. Accordingly, cracking is advantageously prevented from occurring in spite of a relatively thin shaped metal rotor 30.

Thus, there is provided a trimmer capacitor wherein the rotation of the metal rotor 30 changes the opposed area between the rotor electrode 34 and the stator electrode 43, so that the capacitance is variable. The rotor electrode is led out from the metal rotor 30 to the rotor terminal 20 and the stator electrode is led out from the lead-out electrode 45 to the stator terminal 60.

Figure 20:
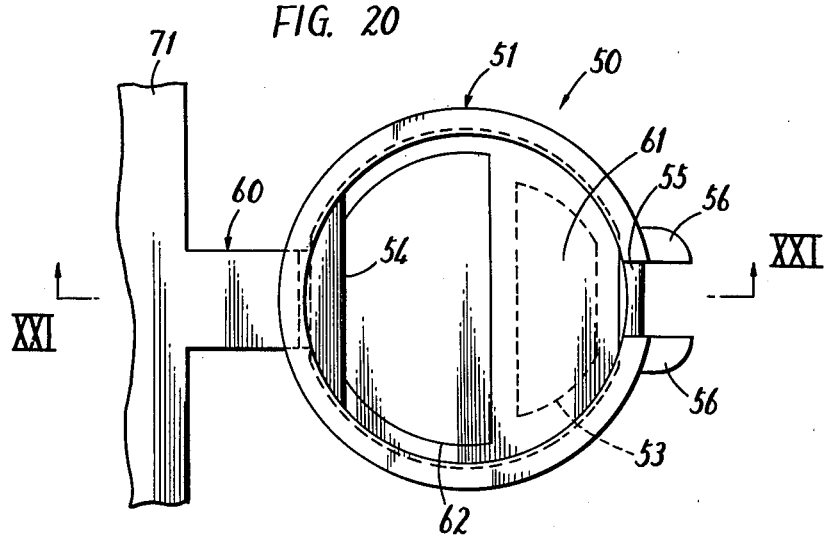
FIG. 20 is a plan view of the insulating case assembly for use in another embodiment of the present invention.
Figure 21:
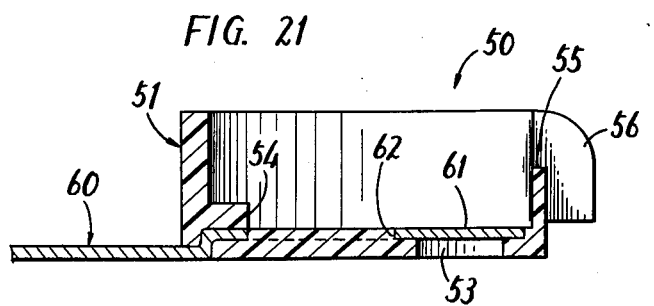
FIG. 21 is a sectional view taken along the line XXI—XXI in FIG. 20.
Figure 22:
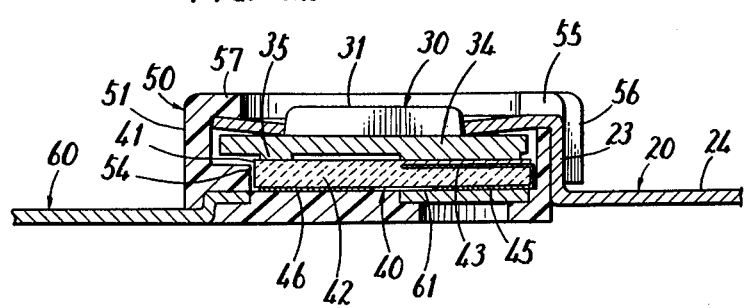
FIG. 22 is a longitudinal sectional view of another embodiment of the present invention implemented using the FIG. 20 insulating case assembly.

FIGS. 20 to 22 are views for explaining a further embodiment of the present invention. This embodiment comprises a modification of the previously described embodiment in conjunction with the structure of the insulating case assembly 50, particularly the position where the exposed portion 61 of the stator terminal 60 is formed. Accordingly, this modified embodiment involves many similar portions as compared with the previously described embodiment and in the following only different portions of the embodiment will be described.

One end portion in the length direction of the stator terminal 60 to be inserted in a mold in molding the insulating case 51 is formed in a substantially circular shape. The one end portion formed in the circular shape is formed with an approximate semicircular aperture 62. The one end portion of the stator terminal 60 is subjected to a molding process of the insulating case 51 so that the one end portion of the stator terminal 60 is disposed along the bottom surface of the insulating case 51. Accordingly, it follows that the exposed portion 61 is formed at the portion where the aperture 62 has not been formed, i.e. at the chip end portion of the above described one end portion. A linear flat wall portion 54 formed extending from the bottom portion of the insulating case 51 is disposed at the side where the stator terminal 60 is led out from the insulating case 51, i.e. at the opposite side from that where the exposed portion 61 is formed.

In the assembled state of the trimmer capacitor, shown in FIG. 22, the dielectric stator 40 is disposed such that the cut portion 41 is disposed to be faced to the flat wall portion 54 of the insulating case 51. At that time the lead-out electrode 45 is in contact with the exposed portion 61 of the stator terminal 60, thereby to establish electrical connection. The remaining portions are substantially the same as those of the previously described embodiment. Accordingly, like portions are denoted by like reference characters and a more detailed description will be omitted.

As has been described so far, according to the present invention capacitance is established between the metal rotor and fixed dielectric stator, and since the stator electrode is provided on the dielectric stator, extremely stable properties can be obtained. The portion where capacitance is established is free from influences of force acting on the terminals. Further, since the metal rotor is supported by the dish-shaped spring portion and the throughgoing hole formed in the center thereof, stabilized torque is imparted to the metal rotor and the thickness of the complete trimmer capacitor can be minimized. For example, it can be reduced to 1.0 mm. Further, no soldering is needed and only insertion of the parts is required for manufacture, thus making easy rationalization and low prices possible. Further, since it is of the casing type using an insulating case, there is no inconvenience caused by the parts coming in contact with other parts, which is also preferable from the point of view of dustproofers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A trimmer capacitor, comprising:
   (a) an insulating case;
   (b) a stator terminal having one end embedded in said insulating case and having another end extending from said insulating case for external electrical connection;
   (c) a dielectric stator fixedly receiving in said insulating case and including a dielectric member;
   (d) a stator electrode electrically connected to said stator terminal;
   (e) a conductive rotor received within said insulating casing and having:
      (1) a first step projecting from its upper surface;
      (2) a second step projecting from a first portion of its lower surface, which surface faces said stator electrode, said second step having a lower end surface which defines a rotor electrode, said rotor electrode contacting said stator and being spaced from said stator electrode through said dielectric member of said dielectric stator; and
      (3) a third step projecting from said lower surface of said rotor and defining an idle electrode, said third step projecting the same distance from said lower surface as said second step, said second and third steps of said metal rotor being located on said lower surface thereof at positions directly opposite to each other in the diametrical direction;
   (f) a conductive rotor terminal extending through said insulating case and having at one end thereof a dish-shaped spring portion, said dish-shaped spring portion being centrally formed with a throughgoing hole, said hole rotatably receiving said first projecting step of said conductive rotor to effect electrical contact between said upper surface of said conductive rotor and said rotor terminal around the entire periphery of said first projecting step, contact between said dish-shaped spring portion and said upper surface being made at a position opposite said idle electrode at all rotational positions of said rotor, said rotor terminal having another end that is led out of said insulating case for external electrical connection; and
   (g) said insulating case being made of thermal plastic and having an upper edge that is bent inward by heating to retain said dielectric stator, said conductive rotor and said rotor terminal within said insulating case, said bent in upper edge being in pressure engagement with said dish-shaped spring portion formed at one end of said rotor terminal, said insulating case being formed with a notch at said upper edge thereof, said other end of said rotor terminal being let out through said notch of said insulating case, said rotor terminal including a portion at said other end thereof which extends outside said insulating case along the outer side surface thereof, said insulating case being intricately formed at said outer side surface thereof with a pair of clamp portions for engaging at least a portion of said other end of said rotor terminal therebetween.

2. A trimmer capacitor in accordance with claim 1, wherein
   said pair of clamp portions of said insulating case are inwardly bent toward each other by heating.

3. A trimmer capacitor in accordance with claim 2 wherein
   said pair of clamp portions and said upper edge of said insulating case are bent by the same heating step.

4. A trimmer capacitor, comprising:
   (a) an insulating case;
   (b) a stator terminal having one end embedded in said insulating case, and having another end extending from said insulating case for external electrical connection;
   (c) a dielectric stator fixedly received in said insulating case and including a dielectric member;
   (d) a stator electrode electrically connected to said stator terminal;
   (e) a conductive rotor received within said insulating case and being rotatable about an axis, said rotor having:
      (1) a first step projecting from its upper surface;
      (2) a second step projecting from a first portion of its lower surface, which surface faces said stator electrode, said second step having a lower end surface which defines a rotor electrode, said rotor electrode contacting said stator and being spaced from said stator electrode through said dielectric member of said dielectric stator; and
      (3) a third step projecting from said lower surface of said rotor and defining an idle electrode, said third step projecting the same distance from said lower surface as said second step, said second and third steps of said metal rotor being located on said lower surface thereof at positions directly opposite to each other in the diametrical direction; and (f) a conductive rotor terminal extending through said insulating case and having at one end thereof a dish-shaped spring portion, said dish-shaped spring portion being centrally formed with a throughgoing hole, said hole being coaxial with said axis and rotatably receiving said first projecting step of said conductive rotor to effect electrical contact between said upper surface of said conductive rotor and said rotor terminal around the entire periphery of said first projecting step, contact between said dish-shaped spring portion and said upper surface being made at a position directly opposite said idle electrode along a direction parallel to said axis at all rotational positions of said rotor, said rotor terminal having another end that is led out of said insulating case for external electrical connection.

5. A trimmer capacitor in accordance with claim 4, wherein said dish-shaped spring portion is frustoconical.

6. A trimmer capacitor in accordance with claim 1, wherein said insulating case is made of thermal plastic and has an upper edge that is bent inward by heating to retain said dielectric stator, said conductive rotor and said rotor terminal within said insulating case, said bent-in upper edge being in pressure engagement with said dish-shaped spring portion formed at one end of said rotor terminal.

7. A trimmer capacitor in accordance with claim 6, wherein said insulating case is formed with a notch at said upper edge thereof, said other end of said rotor terminal being led out through said notch of said insulating case.

8. A trimmer capacitor in accordance with claim 7, wherein said rotor terminal comprises at said other end thereof a portion being externally led out along the outer side surface of said insulating case.

9. A trimmer capacitor in accordance with claim 4, wherein said dielectric stator comprises a lead portion being led to the outer peripheral surface of said dielectric stator and in electrical contact with said stator electrode, and further comprises a lead electrode which extends to the lower surface of said dielectric stator, said lead electrode being in contact with said stator terminal.

10. A trimmer capacitor in accordance with claim 1 or 4, wherein said stator terminal has a tip end of one end portion thereof exposed and in electrical contact with said stator electrode.

11. A trimmer capacitor in accordance with claim 1 or 4, wherein said stator terminal has an intermediate portion of said one end portion thereof exposed and in electrical contact with said stator electrode.

12. A trimmer capacitor according to claims 1, in which said stator electrode is spaced from said rotor by a predetermined thickness of dielectric material, said predetermined thickness of said dielectric material being a part of said dielectric stator.

* * * * *